United States Patent [19]
Grangaard et al.

[11] 3,708,743
[45] Jan. 2, 1973

[54] CIRCUITRY FOR CONTROLLING A.C. POWER

[75] Inventors: Orrin H. Grangaard; Ernest R. Peake, both of St. Paul, Minn.

[73] Assignee: Stage-Brite Inc., Minneapolis, Minn.

[22] Filed: Aug. 4, 1971

[21] Appl. No.: 168,941

[52] U.S. Cl................323/22 SC, 307/263, 307/321, 323/24, 328/185

[51] Int. Cl................G05f 1/44

[58] Field of Search............323/22 SC, 24; 328/185; 307/321, 263, 264

[56] References Cited

UNITED STATES PATENTS

| | | | |
|---|---|---|---|
| 3,593,112 | 7/1971 | Coats | 323/24 |
| 3,364,366 | 1/1968 | Dryden | 328/185 X |
| 3,372,328 | 3/1968 | Pinckaers | 323/24 X |
| 3,493,783 | 2/1970 | Till | 307/321 |
| 3,335,318 | 8/1967 | Yancey | 323/24 |

*Primary Examiner*—Gerald Goldberg
*Attorney*—Merchant & Gould

[57] ABSTRACT

A switching circuit sensitive to the 180° separated zero crossing points in a pulsating D.C. signal from an unfiltered full wave rectifier, which switching circuit resets a reference generator at each zero crossing point. The reference generator produces a three-part signal, each part of which can be varied to provide linear light, square-law light or linear voltage relative to a dimmer control. The three-part signal is compared to a variable D.C. voltage supplied by the dimmer control and the comparison signal is utilized to trigger a thyristor drive circuit. Two power thyristors operate alternately and are triggered by means of a third thyristor connected in a diode bridge circuit so that current therethrough will always flow into the gate of one of the power thyristors.

6 Claims, 2 Drawing Figures

INVENTORS.
ORRIN H. GRANGAARD
ERNEST R. PEAKE
BY
Merchant & Gould
ATTORNEYS

CIRCUITRY FOR CONTROLLING A.C. POWER

BACKGROUND OF THE INVENTION

1. Field of the Invention

In many fields it is desirable to control A.C. power supplied to various electrical appliances, lighting circuits, etc. With the advent of television, dimmer controls for light circuits are especially critical, because of the critical dependence of television cameras on lighting to provide good television reproduction.

2. Description of the Prior Art

In prior art A.C. power controls and especially prior art dimmer circuits where large amounts of A.C. power are being controlled, it is very difficult to obtain a control which is accurately calibrated relative to the actual amount of light produced or relative to the amount of light the human eye sees. Further, prior art circuits are generally unstable and unreliable at the low end of the scale when large amounts of A.C. power are being controlled. In general, prior art devices utilized power thyristors which are switched directly by a control circuit. This direct switching of the thyristors requires a large amount of gate current and greatly reduces the sensitivity of the switching circuit. Further, triggering current is generally applied to both power thyristors simultaneously and the one having the correct anode to cathode voltage thereacross conducts. However, the non-conducting thyristor acts as a diode and provides a conduction path for the triggering current so that in many instances the thyristor that should conduct does not receive sufficient gate current to produce conduction.

SUMMARY OF THE INVENTION

The present invention pertains to circuitry for controlling A.C. power including power means providing a timing signal and D.C. power, reference signal generating means sensitive to the timing signal and providing periodic reference signals having a predetermined shape, manually adjustable means calibrated to provide a variable signal indicative of a desired output, comparing means for comparing the reference signal and the variable signal and providing an output signal to trigger signal generating means which supply gate current to thyristor driving means.

It is an object of the present invention to provide improved circuitry for controlling A.C. power.

It is a further object of the present invention to provide improved reference signal generating means which are quickly adjustable to produce linear light, square-law light or linear voltage relative to a dimmer control.

It is a further object of the present invention to provide improved driving means wherein two power thyristors are utilized for alternating conduction and are triggered separately by a third thyristor which is connected by means of a diode bridge circuit and is itself triggered by the remaining circuitry.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
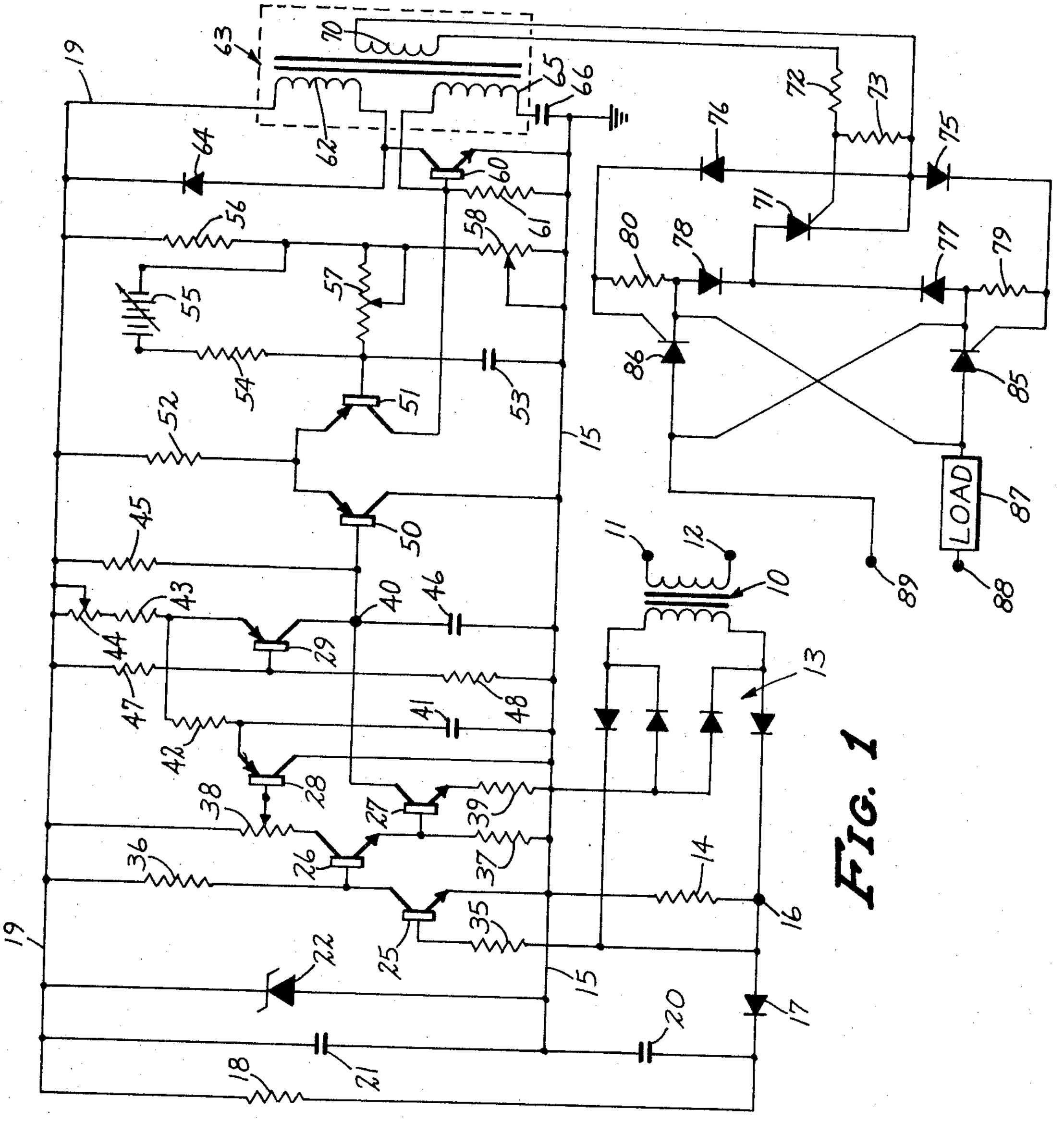
FIG. 1 is a schematic view of the present circuitry.

In FIG. 1 power means or supply include a transformer 10 having a primary connected between a pair of input terminals 11 and 12, adapted to be connected to a suitable source of alternating current, and a secondary attached to a standard diode rectifying bridge circuit 13, the output of which is impressed across a load resistor 14. The load resistor 14 is connected between a common line 15 and a terminal 16, which terminal 16 has available thereon an unfiltered, full wave rectified, pulsating D.C. voltage, as seen in wave form B in FIG. 2. The wave form in B reaches zero each time the sinusoidal input voltage, illustrated in wave form A, crosses the zero line. The anode of a diode 17 is connected to the terminal 16 and the cathode is connected to a current limiting resistor 18. The opposite side of the resistor 18 is connected to a D.C. supply line 19. The cathode of the diode 17 is also connected to a filter capacitor 20, the opposite side of which is connected to the common line 15 and a second filter capacitor 21 is connected between the supply line 19 and the common line 15. A Zener diode 22 is also connected between the supply line 19 and the common line 15 to regulate the D.C. output voltage from the power supply.

A reference signal generating circuit is attached to the power supply circuit and includes semiconductor switching means, having transistors 25, 26 and 27 therein, timing means having transistor 28 therein, and three interrelated signal generating circuits having transistor 29 and its related circuitry therein. Transistors 25, 26 and 27 are the N–P–N type and transistors 28 and 29 are the P–N–P type. The emitter of transistor 25 is connected directly to the common line 15, the base is connected through a resistor 35 to the terminal 16 and the collector is connected through a resistor 36 to the supply line 19. The collector of the transistor 25 is also connected to the base of the transistor 26, the emitter of which is connected through a resistor 37 to the common line 15 and the collector of which is connected through a variable resistor 38 to the supply line 19. The emitter of the transistor 26 is also connected to the base of the transistor 27, the emitter of which is connected through a resistor 39 to the common line 15 and the collector of which is connected to a terminal 40. The base of the transistor 28, forming a portion of the timing circuit, is connected to the movable contact of the variable resistor 38 and the collector is connected directly to the common line 15. The emitter of the transistor 28 is connected through a relatively large timing capacitor 41 to the common line 15 and through a resistor 42 to the emitter of the transistor 29. The emitter of the transistor 29 is also connected through a series connected fixed resistor 43 and variable resistor 44 to the supply line 19. The movable arm of the variable resistor 44 is also connected to the supply line 19. The collector of the transistor 29 is connected to the terminal 40, which is connected through a fixed resistor 45 to the supply line 19 and through a relatively large capacitor 46 to the common line 15.

The base of the transistor 29 is connected through a resistor 47 to the supply line 19 and through a resistor 48 to the common line 15. The output of the reference signal generating means appears at the terminal 40 and is illustrated as wave form D in FIG. 2.

A comparator circuit is attached to the output terminal 40 of the reference signal generating circuit and includes two P–N–P type transistors 50 and 51. The base of the transistor 50 is connected to the terminal 40 and the collector thereof is connected to the common line 15. The emitter of the transistor 50 is connected to the emitter of the transistor 51 and through a resistor 52 to the supply line 19. The base of the transistor 51 is connected through a capacitor 53 to the common line 15 and through a resistor 54 to one side of a variable source of D.C. voltage 55. In general, the voltage source 55 will be located externally of the control circuitry and will generally be a manually operable calibrated control. The opposite side of the voltage source of control 55 is connected through a resistor 56 to the supply line 19, through a variable resistor 57 to the base of the emitter 51 and through a variable resistor 58 to the common line 15. The movable contact of the variable resistor 57 is also connected to the opposite side of the voltage source 55 and the movable contact of the variable resistor 58 is connected to the common line 15. The collector of the transistor 51 provides an output signal to a trigger signal generating circuit.

The trigger signal generating circuit includes an N–P–N type transistor 60, the base of which is connected to the collector of the transistor 51 and through a resistor 61 to the common line 15. The emitter of the transistor 60 is connected directly to the common line 15 and the collector is connected through a primary winding 62 of a saturable core transformer, generally designated 63, to the supply line 19. A diode 64 is connected in parallel with the primary winding 62 to remove transients and the like from the transformer primary 62. The base of the transistor 60 is also connected through a series connected secondary winding 65 of the transformer 63 and a capacitor 66 to the common line 15. The secondary winding 65 is connected to the base of the transistor 60 so that collector current of the transistor 60 through the primary winding 62 induces a current into the secondary winding 65 which causes the transistor 60 to turn on harder. Another secondary winding 70 of the transformer 63 has one side connected to the cathode of a thyristor, which in this embodiment is SCR 71, and the other side connected through a resistor 72 to the gate of the SCR 71. A resistor 73 is connected directly between the gate and the cathode of the SCR 71. The cathode of the SCR 71 is connected to the anode of a diode 75 and the anode of a diode 76. The anode of the SCR 71 is connected to the cathode of a diode 77 and the cathode of a diode 78. The cathode of the diode 75 is connected through a resistor 79 to the anode of the diode 77. The cathode of the diode 76 is connected through a resistor 80 to the anode of the diode 78. Diodes 75–78 form a bridge circuit with the SCR 71 connected across the output thereof. The cathode of the diode 75 is connected directly to the gate of a power thyristor, such as SCR 85. The cathode of the diode 76 is connected directly to the gate of a power thyristor, such as SCR 86. The cathode of the SCR 85 is connected directly to the anode of the diode 77 and, through a line designed to carry large amounts of current, to the anode of the SCR 86. The cathode of the SCR 86 is connected directly to the anode of the diode 78 and, through a line designed to carry large amounts of current, to the anode of the SCR 85. The anode of the SCR 85 is connected through a desired load 87 to a power terminal 88. The anode of the SCR 86 is connected directly to a power terminal 89. The terminals 88 and 89 are adapted to have a suitable source of A.C. power attached thereto for driving the load 87 through the SCR's 85 and 86.

Figure 2:
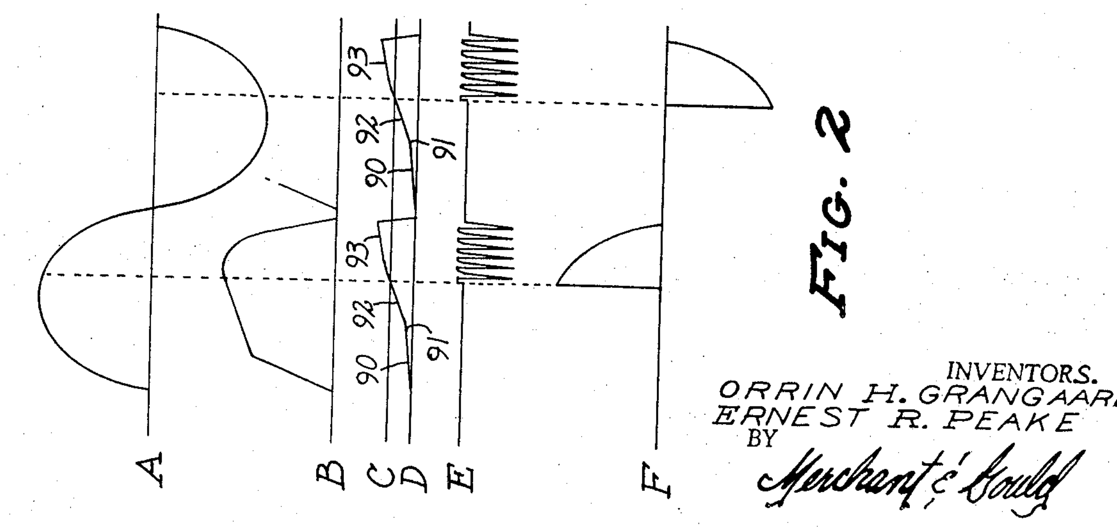
FIG. 2 illustrates voltage wave forms appearing at various points of the circuitry illustrated in FIG. 1.

In the operation of the present circuitry, alternating power is applied to the power supply and a full wave rectified, unfiltered voltage, as illustrated in B of FIG. 2, is applied through the resistor 35 to the base of the transistor 25. The full wave rectified voltage is also filtered and regulated by means of the Zener 22 and supplies D.C. voltage to the supply line 19. Simultaneously the A.C. power is applied between the terminals 88 and 89, which are connected to the SCR's 85 and 86. In the present embodiment, the reference signal generating circuitry is designed so that the transistor 25 is non-conducting when the voltage applied to the base thereof is below approximately 0.6 volts. Whenever the transistor 25 is non-conducting the transistor 26 conducts and turns on the transistor 27 which provides a low resistance path for the discharge of capacitor 46. Also, transistor 28 is turned on and provides a low resistance path for the discharge of the capacitor 41. The setting of the variable resistor 38 determines the extent to which the capacitor 41 will discharge, as will be seen presently. Thus, each time the timing signal from the power supply goes to zero the reference signal generating circuitry is reset.

When the timing signal from the power supply exceeds 0.6 volts in amplitude, the transistor 25 begins to conduct and the voltage on the base of the transistor 26 is lowered so that that transistor is cut off. When transistor 26 is cut off, transistor 27 is also in a non-conducting state so that the low resistance path to the common line 15 for the capacitor 46 is removed. Transistor 28 is also in a non-conducting state so that the low resistance path to the common line 15 for the capacitor 41 is removed. Capacitor 46 begins to charge through the relatively high resistance of the resistor 45 and the output at the terminal 40 appears as the portion 90 of the wave form D in FIG. 2. Capacitor 41 also begins to charge through resistors 42, 43 and 44. Resistors 47 and 48 form a bias network for the transistor 29 and maintain the transistor 29 in a non-conducting state until the voltage on the emitter exceeds the voltage on the base by a required amount. The setting of the variable resistor 38 determines the voltage on the base and, thus, the ultimate voltage on the emitter when the transistor 28 becomes non-conducting. Since the capacitor 41 may remain partially charged and since the combined resistance of the resistors 42, 43 and 44 is substantially smaller than the resistance of the resistor 45, the capacitor 41 reaches a voltage sufficient to turn on the transistor 29 before the capacitor 46 has charged to a very large percentage of the supply voltage.

Once the capacitor 41 charges to a value sufficient to raise the emitter of transistor 29 above the base, transistor 29 begins to conduct. The beginning of conduction of the transistor 29 is illustrated by the curve 91 in wave form D of FIG. 2. Conduction of transistor 29 provides a current path through resistors 43 and 44 and the emitter to collector circuit of transistor 29 for the charging of capacitor 46. The completion of the turn on of transistor 29 is determined by the time constant of the resistor 42 and capacitor 41 and, thus, resistor 42 determines the roundness of the curve at 91 in wave form D. With the full conduction of transistor 29, capacitor 46 begins to charge at a rate designated by the slope 92 in D, which rate is determined primarily by the adjustment of the adjustable resistor 44.

After a period of time the transistor 29 saturates and the rate of charge of the capacitor 46 assumes a slope designated 93 in D of FIG. 2. The slope and roundness of the transition from the portion 92 to the portion 93 is determined by the value of the parallel combination of resistors 47 and 48, that is as the resistance of the parallel combination increases the roundness of the transition decreases. Finally at some period of time subsequent to the saturation of transistor 29, the timing signal (wave form B in FIG. 2) drops below 0.6 volts and capacitors 41 and 46 are discharged through transistors 28 and 27, respectively. The entire cycle then begins again.

The output wave form illustrated in D of FIG. 2 is applied to the base of transistor 50 which, in cooperation with transistor 51, forms a comparator circuit. The control or variable source of D.C. voltage 55 applies a voltage to the base of the transistor 51 which maintains that transistor cut off until the voltage applied to the base of the transistor 50 equals or exceeds the voltage supplied by the variable source 55. When the two voltages are equal the transistor 51 begins to conduct and supplies collector current to the base of the transistor 60. The setting of variable resistor 57 determines the ratio between the resistors 54 and 57, which in turn determine the amount of voltage from the source 55 that is prevalent at the base of transistor 51. Adjustment of the resistor 57 is utilized to set the full scale value of the control 55. Adjustment of resistor 58 is utilized as the zero adjust for control 55.

When the current supplied by transistor 51 to the base of the transistor 60 reaches an amount sufficient to turn on the transistor 60, a current path is completed from the supply line 19 through the primary winding 62 of the transformer 63 and transistor 60 to the common line 15. The current through the primary winding 62 induces a current into the secondary winding 65 which provides a positive feedback to the base of the transistor 60 to rapidly saturate. Saturation of the transistor 60 provides a path for the discharge of capacitor 66, through the base-emitter junction thereof. Since transformer 63 is a saturable transformer, saturation of the transistor 60 causes the ultimate saturation of transformer 63, some 5 microseconds later in this embodiment, and the current induced into the secondary winding 65 goes to zero, removing the positive feedback voltage, and biasing the transistor 60 into a non-conducting state. The capacitor 66 is then charged by the collector current from transistor 51 until the energy in transformer 63 has collapsed sufficiently to allow the transistor 60 to turn on. Once the transistor 60 is no longer back biased by the collapse of energy in the transformer 63, if control current is still being supplied by the transistor 51 the transistor 60 turns on and repeats the above-described procedure. The trigger signals produced by this procedure are illustrated in E of FIG. 2. These trigger signals are applied through the secondary winding 70 of the transformer 63 to the gate of the SCR 71.

Whenever a trigger signal is applied to the gate of the SCR 71, the SCR 71 is turned on because the bridge circuit formed by diodes 75–78 bias the SCR 71 into a conducting state whether terminal 88 is positive or terminal 89 is positive. When SCR 71 turns on, gate current is supplied from SCR 71 through the diode 75 to the gate of the power SCR 85 and from the cathode of the power SCR 85 through the diode 77 to the SCR 71 or from the SCR 71 through the diode 76 to the gate of the power SCR 86 and from the cathode of the SCR 86 through the diode 78 to the SCR 71, depending upon the polarity of the voltage applied between the terminals 88 and 89. When gate current is supplied to either of the power SCR's 85 or 86, current flows from the terminal 88, through the load 87 and the power SCR 85 to the terminal 89 or from the terminal 89 through the SCR 86 and the load 87 to the terminal 88, respectively. The voltage applied between the terminals 88 and 89 also biases the various diodes 75–78 so that gate current is supplied through the SCR 71 only to the proper power SCR 85 or 86. In addition to only supplying gate current to the properly biased power SCR 85 or 86, the SCR 71 supplies a sufficient amount of gate current while receiving only a trigger signal from the previously described circuitry. Thus, the drain on the circuitry is relatively small and the sensitivity or control throughout the range of the variable source 55 is good and dependable. The trigger circuit is designed to generally provide a series of trigger pulses so that the second pulse will trigger the SCR 71 in the event that the initial pulse fails for one reason or another. Thus, the series of trigger pulses increases the dependability of the circuitry.

Listed below are typical values for the various components in the above-described circuitry:

| Resistors | Value |
|---|---|
| 14 | 4.7K Ohms |
| 18 | 220 |
| 35 | 4.7K |
| 36 | 10K |
| 37 | 10K |
| 38 | 2K Pot. |
| 42 | 100 |
| 43 | 470 |
| 44 | 10K Pot. |
| 45 | 180K |
| 47 | 1.5K |
| 48 | 1K |
| 52 | 10K |
| 54 | 22K |
| 56 | 4.7K |
| 57 | 10K Pot. |
| 58 | 10K Pot. |
| 61 | 10K |
| 72 | |
| 73 | |
| 79 | 100 |
| 80 | 100 |
| **Capacitors** | **Value** |
| 20 | 35 Mfd. |
| 21 | 35 |
| 41 | 2.2 |
| 46 | 1 |
| 53 | 1 |
| 66 | 0.0039 |

| Diodes | Type |
|---|---|
| 13 (4 diodes) | 1N4148 |
| 17 | 1N4148 |
| 22 | 10V Zener |
| 64 | 1N4148 |
| 75-78 | 1N4003 |
| Transistors | Type |
| 25 | 2N3565 |
| 26 | 2N3565 |
| 27 | 2N3565 |
| 28 | 2N4248 |
| 29 | 2N4248 |
| 50 | |
| 51 | |
| 60 | 2N3569 |
| 71 | C106B1 |
| 85 | C35B or 2N685 |
| 86 | C35B or 2N685 |

The above-described circuitry and the typical values listed therefor simply describe one embodiment for the circuitry and, while we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. Circuitry for controlling A.C. power to a load comprising:

a. power means adapted to be attached to a source of A.C. power for providing a timing signal and D.C. power;

b. reference signal generating means connected to receive D.C. power from said power means and to provide a reference signal upon the application thereto of each timing signal, comprising:

i. a first signal generating circuit connected to receive the D.C. power, said first generating circuit operable to produce a first portion of an output signal;

ii. a second signal generating circuit connected to receive the D.C. power and connected to said first signal generating circuit, said second signal generating circuit operable to produce a second portion of the output signal;

iii. a secondary timing circuit connected to said second signal generating circuit for activating said second signal generating circuit a predetermined period of time after the beginning of the first portion of the output signal; and iv. reset switching means connected for receiving said timing signal, said reset switching means connected for resetting said first and second signal generating circuits and said secondary timing circuit at the completion of each cycle of said timing signal;

c. manually adjustable means for providing a variable signal indicative of a desired output from said circuitry;

d. comparing means connected to receive the reference signal from said generating means and the variable signal from said adjustable means and to provide an output signal when the two received signals reach a predetermined relative relationship;

e. trigger signal generating means connected to receive the output signal from said comparing means and to provide trigger signals upon the reception thereof; and f. driving means connected to receive the trigger signals and adapted to be connected to an A.C. power source and a load, said driving means supplying pulses of A.C. power to the load upon the application of trigger signals thereto.

2. Circuitry as set forth in claim 1 wherein the power means includes an output having a full wave rectified pulsating signal thereon which constitutes the timing signal.

3. Means for generating a periodic reference signal in response to a periodic timing signal comprising:

a. a first signal generating circuit adapted to be connected to a suitable source of electrical power, said first generating circuit operable to produce a first portion of an output signal;

b. a second signal generating circuit adapted to be connected to a suitable source of electrical power and connected to said first signal generating circuit, said second signal generating circuit operable to produce a second portion of the output signal;

c. a secondary timing circuit connected to said second signal generating circuit for activating said second signal generating circuit a predetermined period of time after the beginning of the first portion of the output signal; and d. reset switching means for receiving said periodic timing signal, said reset switching means connected for resetting said first and second signal generating circuits and said secondary timing circuit at the completion of each cycle of said periodic timing signal.

4. Reference signal generating means according to claim 3 wherein said first signal generating circuit comprises a first resistor and a capacitor connected in series.

5. Reference signal generating means according to claim 4 wherein said second signal generating circuit comprises a transistor having a second resistor in its emitter-collector circuit, said transistor connected in parallel with said first resistor.

6. Reference signal generating means according to claim 5 wherein said secondary timing circuit comprises a resistance capacitance circuit connected to said transistor, for causing said transistor to begin conduction a predetermined period to time after the beginning of the first portion of the output signal, so as to cause the said second signal generating circuit to produce the second portion of the output signal, said secondary timing circuit further operable to cause said transistor to saturate after a further time period so that said second signal generating circuit thereby produces a third portion of the output signal.

* * * * *